United States Patent [19]

Meckel et al.

[11] 4,069,569

[45] Jan. 24, 1978

[54] DEFLECTION-CONTROLLED ROLL FOR THE PRESSURE TREATMENT OF MATERIALS IN WEB FORM

[75] Inventors: Werner Meckel, Nienhagen; Werner Kilian, Wettbergen, both of Germany; Rolf Lehmann, Mutschellen; Armin Siegfried, Zurich, both of Switzerland

[73] Assignees: Continental Gummi-Werke A. G.; Escher Wyss Limited, both of Zurich, Switzerland

[21] Appl. No.: 686,292

[22] Filed: May 14, 1976

[30] Foreign Application Priority Data

May 15, 1975 Switzerland .................... 6241/75

[51] Int. Cl.² .......................................... B21B 13/02
[52] U.S. Cl. .............................................. 29/116 AD
[58] Field of Search .......... 29/116 AD, 113 AD, 132, 29/130, 129.5

[56] References Cited

U.S. PATENT DOCUMENTS

| Re. 26,219 | 6/1967 | Kusters et al. | 29/116 AD X |
|---|---|---|---|
| 1,997,442 | 4/1935 | Walsh | 29/130 X |
| 3,119,324 | 1/1964 | Justus | 29/116 AD X |
| 3,184,828 | 5/1965 | Dames | 29/132 X |
| 3,308,523 | 3/1967 | Ivester et al. | 29/130 X |
| 3,389,450 | 6/1968 | Robertson | 29/116 AD |
| 3,665,572 | 5/1972 | Robertson | 29/116 AD |
| 3,676,908 | 7/1972 | Wittler et al. | 29/116 AD X |
| 3,802,044 | 4/1974 | Spillmann et al. | 29/113 AD |
| 3,846,883 | 11/1974 | Biondetti | 29/116 AD |
| 3,854,646 | 12/1974 | Dorfel et al. | 29/113 AD X |

FOREIGN PATENT DOCUMENTS 651,969  11/1951  United Kingdom .................. 29/131

*Primary Examiner*—Alfred R. Guest
*Attorney, Agent, or Firm*—Pennie & Edmonds

[57] ABSTRACT

A deflection-controlled roll has a roll shell rotatably mounted about a fixed beam and disposed on a plurality of hydraulic piston support or pressure devices positioned along the roll for exerting forces between the beam and the roll shell. The roll shell is formed of an elastomeric material and is provided with a stiffener insert embedded in the material of the shell for increasing its resistance to circumferential deformation. The stiffener insert may include a metal helical coil extending about the axis of the roll shell or a corrugated tube coaxial with the shell. The roll shell may also include a plurality of annular inserts spaced along the interior of the shell the inner surfaces of which form bearing surfaces for the support devices.

12 Claims, 7 Drawing Figures

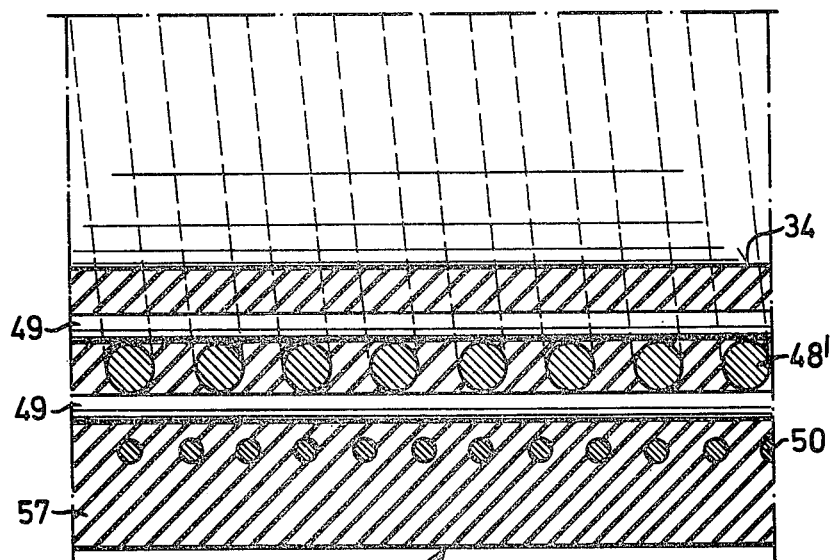
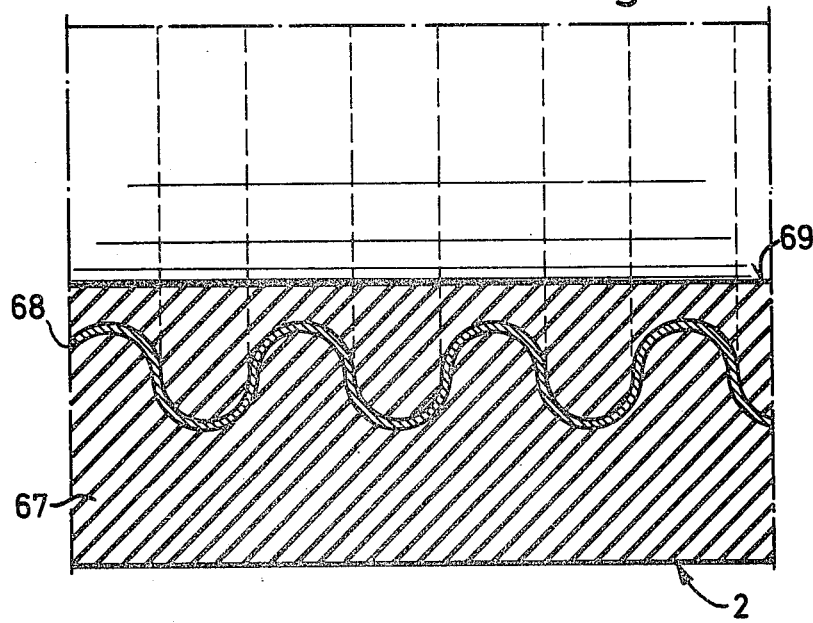

DEFLECTION-CONTROLLED ROLL FOR THE PRESSURE TREATMENT OF MATERIALS IN WEB FORM

The present invention relates to a deflection-controlled press roll for the pressure treatment of material in web form comprising a tubular roll shell rotatably mounted about a fixed beam and disposed on bearing surfaces of piston-like support or pressure devices positioned between the beam and the roll shell.

Known rolls of this type are commonly used in presses to apply uniform pressure to a web passing between the deflection-controlled roll and a counter-roll. The piston-like support devices of the deflection-controlled roll not only prevent sagging of the roll shell by exerting support forces between the beam and the shell but in addition enable the roll shell to be deflected toward the counter-roll so that a uniform pressure across the length of the rolls is obtained despite sagging of the co-acting roll. There are cases, however, where the deflection of the counter-roll is so great that a deflection compensating roll constructed in the known manner is unable to follow the sag of the co-acting roll. Moreover, in some cases, it is desirable to vary the pressure across the press rolls rather than pressing them together with a uniform pressure over their entire length. This is the case, for example, in rotary printing presses which employ a flexible stereo cylinder and where frequently the full width of the stereo cylinder is not utilized for printing. While known deflection compensating rolls, whether those provided with a pressure chamber of the type shown in German Pat. No. 1,411,327, or those with hydrostatic bearing devices, according to U.S. Pat. No. 3,802,044, are superior to previously used rolls without deflection compensation, they are nevertheless not entirely satisfactory when used with flexible stereo cylinders.

The present invention relates to a further development of a deflection compensating roll of the type shown in U.S. Pat. No. 3,802,044, with the object of providing a roll for pressing webs against a flexible counter-roll, such as the stereo cylinder of a rotary printing press, and which permits the application of a greater contact pressure in selected zones than in other zones along the length of the two rolls or even to operate with a gap between the surfaces of the two rolls in the zones of reduced pressure.

These objects are achieved in the roll of the present invention by constructing the roll shell from an elastomeric or rubber-like material and by providing the shell with a stiffener insert of a rigid material which increases the circumferential stiffness or the resistance of the roll shell to circumferential deformation without unduly reducing its lateral flexibility to bending. The stiffener may advantageously include at least one helical metal coil insert, preferably of steel, embedded in the elastomeric material of the shell. Such a construction is relatively easy to manufacture and possesses the requisite resistance to local circumferential deformations so that the internal surface of the shell provides a smooth bearing surface for the piston-like support devices while at the same time the roll shell is sufficiently flexible so that it can conform to the contour of a flexible counter-roll during operation. The cross-section of the wire of the helical insert may be circular or angular, for example, rectangular. In the case of a coil with a rectangular cross-section, the pairs of opposite sides of the coil may preferably be respectively parallel and perpendicular to the axis of the roll shell.

The roll shell may also include annular inserts or rings preferably formed of a metal and spaced along the interior of the roll shell in alignment with the support devices. The inner surfaces of the annular inserts in such an arrangement provide bearing surfaces for the support devices.

In all of these embodiments of the invention, it is possible to use at least one additional inserted layer consisting of a thread-like or wire-like filamentary material with the filaments thereof extending longitudinally of the roll shell. In such an arrangement, the filaments absorb the longitudinal forces acting on the roll shell without increasing the stiffness to lateral bending of the shell above an acceptable or desired level. The filaments of the material may be metal wires or textile fibers which extend either in a direction parallel to the axis of the roll shell or obliquely thereto. In an oblique arrangement, two layers of the filamentary material may be provided with the filaments of the two layers angularly oriented symmetrically with respect to the axis of the roll shell.

It is also possible to provide as an insert a corrugated tube that is coaxial with the roll shell. Since the material of a corrugated tube is uniformly distributed at its periphery, such a construction facilitates the balancing of roll shells designed for high rotational speeds and at the same time possesses the desired characteristics with regard to stiffness in the circumferential and axial directions.

For optimum utilization of the flexibility of the roll shell constructed in accordance with the present invention, the pressure exerted by the support devices may be individually controlled independently of one another. In such an arrangement, the contact pressure along the roll can be controlled to extend along the entire roll length or just over selected zones.

Preferably, the piston-like support devices may be hydraulically operated and the force exerted by the individual support devices controlled by connecting or disconnecting the devices from the source of pressurized fluid or by regulating the pressure of the fluid supplied to each support device. Advantageously, the support devices may be provided with bearing pads having recesses or pockets which are supplied with pressurized fluid which forms a hydrostatic fluid cushion between the bearing surfaces of the support devices and the interior surface of the roll shell. In this way, the roll shell slides on the hydrostatic cushion without direct contact between the support devices and the shell, minimizing friction and wear of the bearing surfaces. This construction is capable of compensating for sag in the roll shell and is particularly advantageous if, as in the case of the present invention, the roll shell is made from an elastomeric material the slide bearing characteristics of which are not as good as that of a metal.

In addition to the hydraulic support devices arranged in a row which press the roll shell against the counter-roll, the roll may also be provided with lift-off devices of the same construction but disposed diametrically opposite the row of support devices. When actuated simultaneously with the support devices of a given portion of the roll, the lift-off devices raise the roll shell from the co-acting roll in the zones where no contact pressure is required. If, on the other hand, only the lift-off devices are actuated, they raise the entire roll shell from the co-acting roll facilitating the feeding or removal of the webs from the press without the need for separate raising or pressing mechanisms such as levers operated by compressed air cylinders.

Further details of the invention will be apparent from the following description of exemplified embodiments with reference to the accompanying drawings wherein:

FIGS. 4–6 are partial sections of further embodiments of a roll shell according to the invention;

Figure 1:
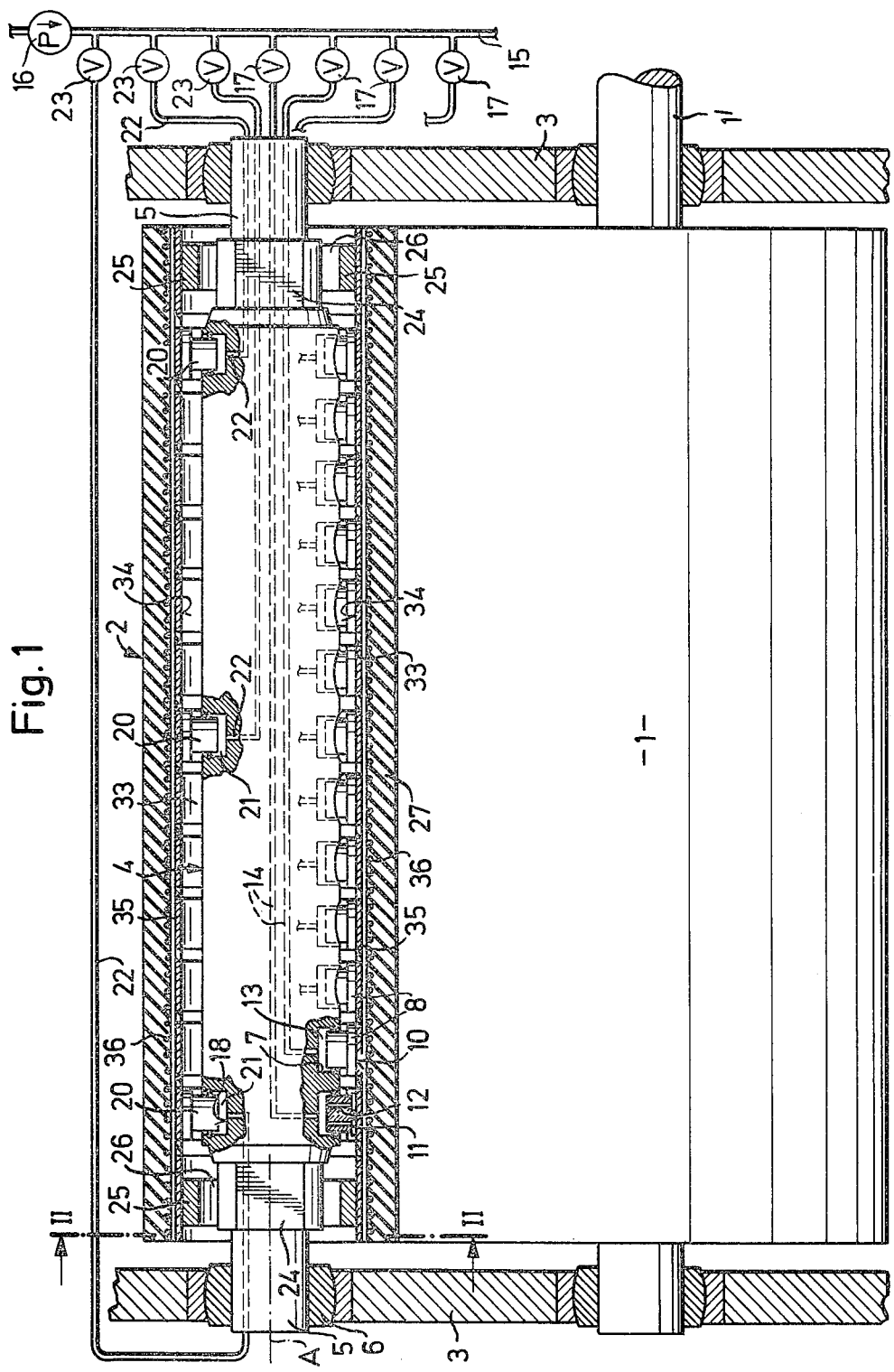
FIG. 1 is a diagrammatic partial section of a printing unit of a photogravure rotary printing press which utilizes a deflection-controlled roll according to the present invention as the presser roll.

Referring now to the drawings, FIG. 1 diagrammatically illustrates the printing unit of a rotogravure rotary printing press comprising an engraved stereo cylinder 1 and a deflection-controlled press roll 2. The stereo cylinder 1 is rotatably mounted in a housing 3 and is driven via shaft 1'. The press roll 2 includes a fixed beam 4 and a roll shell 27 formed from a rubber-like material and rotatably mounted about the beam 4. The ends 5 of the beam 4 are supported in ball bearing boxes 6 which permit the beam to flex or sag and the beam is prevented from rotating in the housing 3 by means not shown in the drawing.

The roll shell 27 is disposed on piston-like hydrostatic support or pressure devices 8 seated in bores 7 formed in the beam 4 in a row along the line of contact between the roll 2 and the stereo cylinder 1. The support devices 8 may preferably be of the type described in U.S. Pat. No. 3,802,044, which are in the form of pistons provided with bearing pads 10 having pockets 11 which are connected via flow restrictors or choke bores 12 with the cylinder chambers 13 of bores 7 in which the elements 8 are seated. Each of the cylinder chambers 13 of the bores 7 is in turn connected by a separate duct 14 with the pressure line 15 of a pump 16 which supplies hydraulic pressure fluid to the hydrostatic support devices 8. Each of the ducts 14 has a pressure regulating valve 17 by means of which the pressure of the fluid supplied to the associated cylinder chamber 13 of each support device 8 can be individually controlled. The pressurized fluid, supplied to the pockets 11 of the support devices from the chambers 13 via the choke bores 12, forms a hydrostatic fluid cushion between the faces of the bearing pads 10 and the interior surface of the roll shell 27 on which the shell slides freely while rotating.

The roll 2 is also provided with cylinder bores 18 in which are seated piston-like devices 20 of the same construction as the support devices 8. The bores 18 include cylinder chambers 21 which are connected to the pressure fluid line 15 via ducts 22. The ducts 22 are also provided with pressure regulating valves 23 for controlling the pressure of the fluid supplied to the cylinder chambers 21. The piston-like devices 20 are disposed diametrically opposite the support devices 8 with respect to the axis A of the roll and act as lift-off elements.

Figure 2:
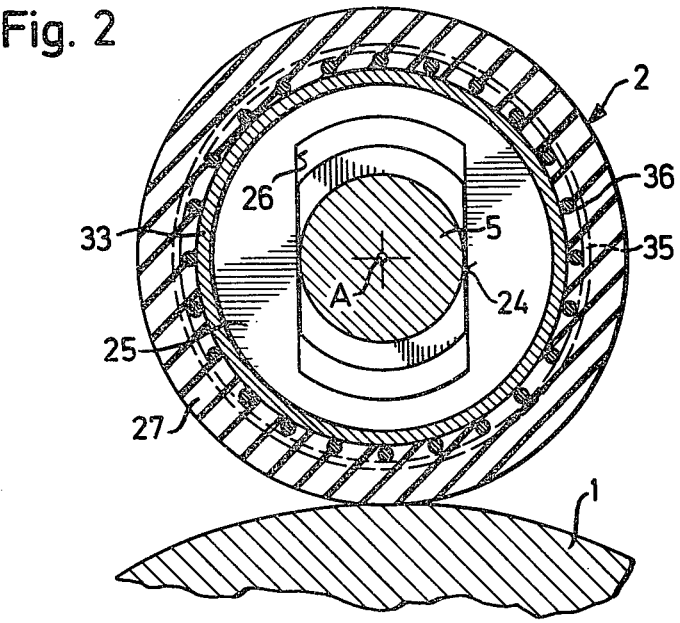
FIG. 2 is a section on the line II — II of FIG. 1.

As shown in FIGS. 1 and 2 the ends of the beam 4 are provided with flat guide surfaces 24 which are in sliding engagement with the sides of elongated openings 26 of guide rings 25. The elongated openings 26 permit the roll shell 27, which is rotatably mounted about the rings 25, to move laterally with respect to the beam in response to the forces exerted on the roll shell by either the lift-off devices 20 or the support devices 8.

Because the scale of FIG. 1 is too small for adequate illustration of the construction of the elastomeric roll shell in accordance with the invention, the various forms of the shell which may be employed are shown in greater detail in the subsequent figures.

During operation, the stereo cylinder 1 rotates and transfers ink in a known manner to a paper web (not shown) passing between the stereo cylinder 1 and the roll 2, the latter acting as a presser roll. The contact pressure between the roll 2 and the stereo cylinder 1 is regulated by controlling the forces exerted by the individual support devices 8 through appropriate adjustment of the regulating valves 17. Thus, for example, if it is desired to apply pressure only in the middle of the cylinder 1, only the support devices 8 in the middle of the roll 2 are actuated. At the same time, the lift-off devices 20 situated at the two ends of the roll 2 can also be actuated to reduce or completely eliminate the contact pressure at the ends of the roll shell 27. If desired the end portions of the roll shell 27 can be raised from the stereo cylinder 1 and the two rolls operated with a gap in the zones of reduced pressure by an appropriate adjustment of the pressure of the fluid supplied to the lift-off devices since the guide rings 25, about which the shell is mounted, are free to move laterally with respect to the beam 4.

Figure 3:
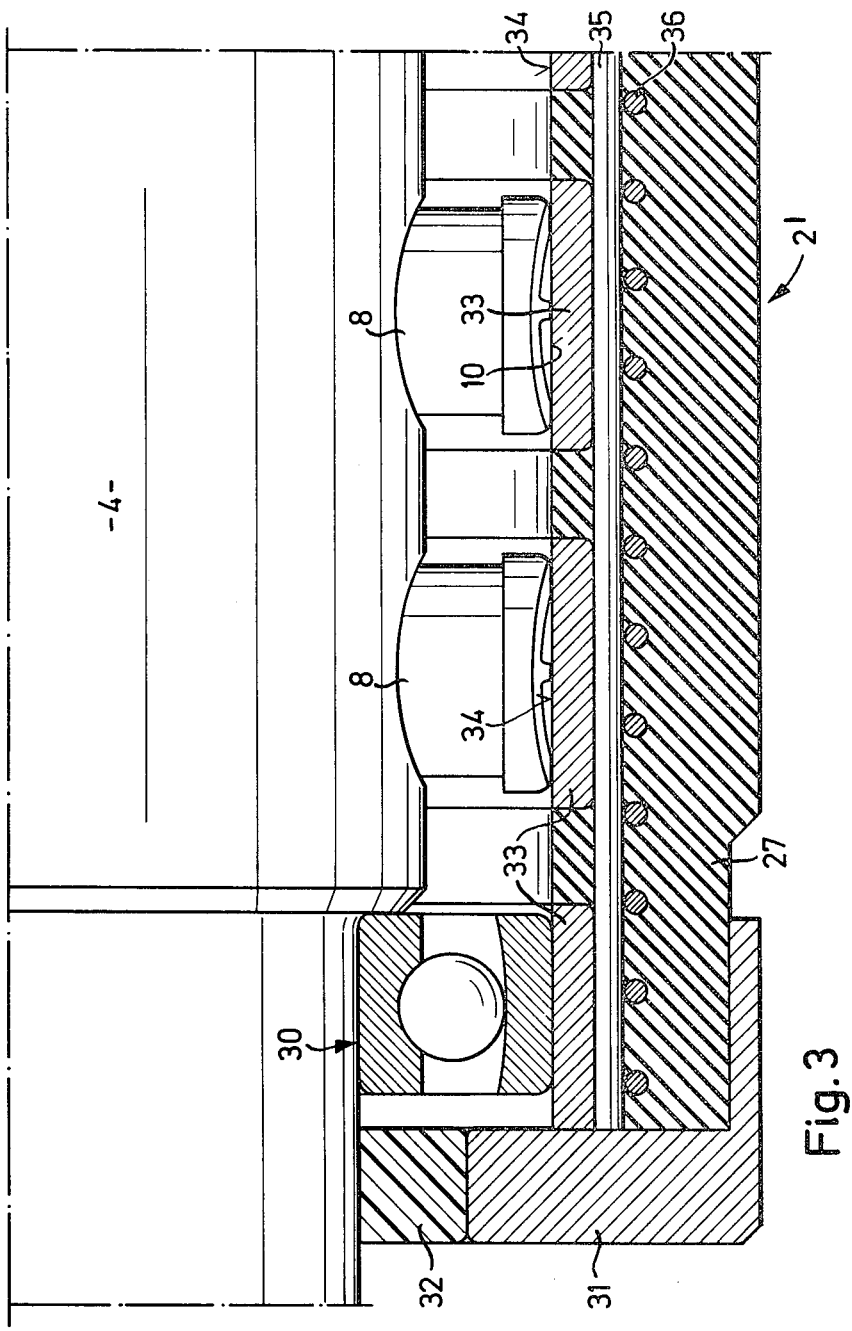
FIG. 3 is a partial section showing one end of another embodiment of a press roll according to the present invention.

FIG. 3 illustrates a modified support structure for the ends of the roll shell of FIG. 1. In the embodiment of FIG. 3 the ends of the roll shell 27 are rotatably mounted on roller bearings 30 disposed about the ends of the beam. Because the roll shell is mounted on roller bearings rather than guide rings as in the embodiment of FIG. 1, lateral movement of the roll shell with respect to the fixed beam is not possible in the construction of FIG. 3. Movement of the press roll toward and away from the stereo cylinder in such an arrangement can, however, be effected by employing an external piston-cylinder mechanism disposed at each end of the press roll.

Figure 7:
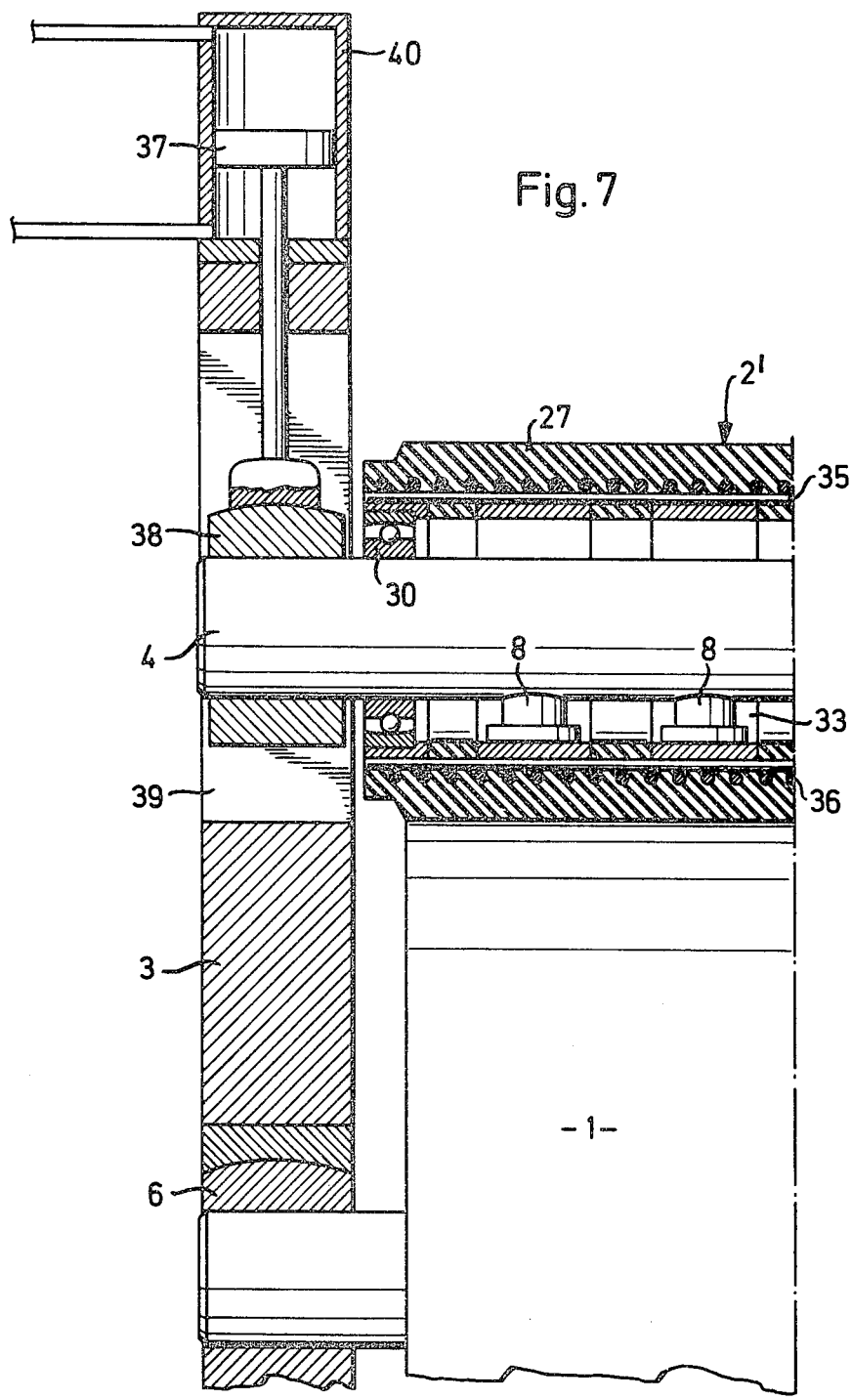
FIG. 7 is a partial section of one end of a modification of the press roll shown in FIG. 1.

FIG. 7 shows one end of a press roll of the construction illustrated in FIG. 3 in which a piston 37 seated in a cylinder 40 is used to raise or press the roll 2' against the co-acting roll 1. The piston 37 is connected to a guide element 38 mounted about the end of the fixed beam and slideably disposed in guide 39 of housing 3. As pressurized fluid is injected into the upper or lower chamber of the cylinder 36, the piston 37 exerts a corresponding force on the end of the beam which presses the roll 2' against or lifts it from the co-acting roll 1.

Referring now back to FIG. 3, the elastomeric roll shell 27 there shown is provided with annular inserts or rings 33 which are vulcanized into the rubber-like material of the shell 27. The surfaces 34 of rings 33 are aligned with and form bearing surfaces for the bearing pads 10 of the support elements 8. Below the rings 33, as viewed in FIG. 3, is a layer 35 of wires extending axially of the roll shell 27 for absorbing axial forces acting on the roll shell. The roll shell is further provided with an additional inserted layer 36 consisting of a metal coil wound around the wire of layer 35. The roll shell constructed in the manner shown in FIG. 3 can be used in the embodiment of FIG. 1 as well as in this embodiment. As shown in FIG. 3, in an arrangement wherein the roll shell is mounted on roller bearings, the ring 33 adjacent the end of the roll locates the roll shell in the bearing 30.

Figure 4:
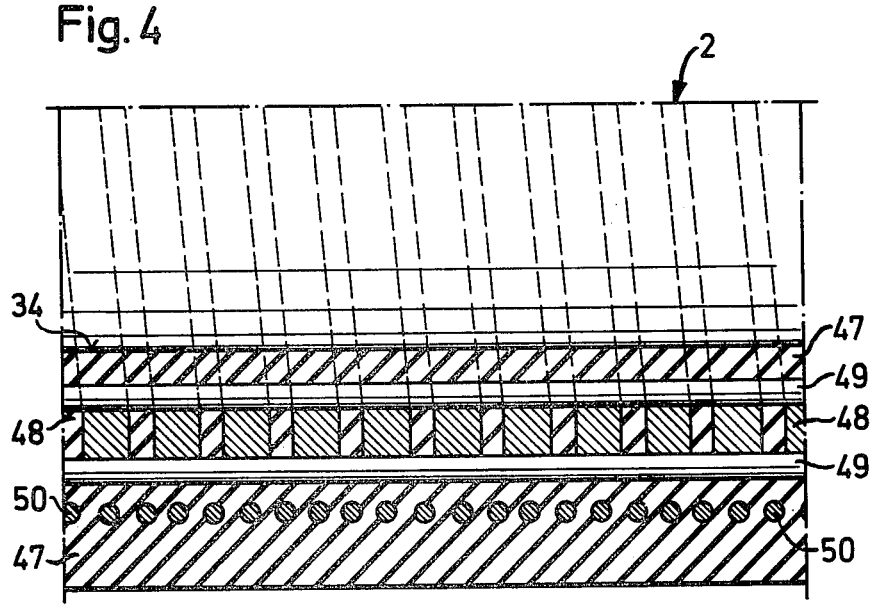

FIG. 4 illustrates another embodiment of the roll shell which may be utilized in the embodiments of either FIG. 3 or FIGS. 1 and 2. The roll shell 47 is provided with a coil 48 of helically wound wire having a rectangular cross-section. On both sides of the coil 48 are layers 49 consisting of wires extending either axially or at an angle with respect to the roll axis. Finally, the roll shell is provided with an insert 50 consisting of a wire wound in a helical coil about the axis of the shell.

FIG. 5 shows another embodiment which is essentially the same as that of FIG. 4, except that the spiral coil 48 is formed from a wire having a circular cross-section. The other inserts or layers of the roll shell 57 are formed in the same manner as in the embodiment of FIG. 4.

FIG. 6 shows a portion of roll shell 67 in which the insert is a corrugated tube 68. The corrugated tube is coaxial with the roll shell and is completely embedded in the rubberlike material of the roll shell 67. the cylindrical or slightly conical interior surface 69 of the shell acts as a bearing surface for the piston-like support devices 8 and lift-off devices 20.

The inserts shown in the above figures may be formed from any suitable rigid material. Advantageously, the inserts extending in a circumferential direction such as the coils, annular inserts and the corrugated tube are made of a metal, preferably steel. The filamentary layers extending longitudinally along the roll shell may consist of metal wires or textile fibers.

We claim:

1. A deflection-controlled roll for the pressure treatment of materials in web form comprising a fixed beam, a generally cylindrical roll shell rotatably mounted about said beam and a plurality of hydraulic piston pressure devices disposed along the roll between said beam and said shell for exerting forces therebetween, said pressure devices each having a bearing surface facing the interior of said shell, said roll shell being formed at least substantially of an elastomeric material and having a longitudinally and circumferentially extending stiffener insert for increasing resistance of the shell to deformations during operation embedded in said elastomeric material, the interior regions of said shell adjacent said pressure devices forming bearing surfaces for said pressure devices.

2. A roll according to claim 1 wherein said insert includes at least one coil of rigid material extending around the axis of said shell and a layer of longitudinally extending filaments spaced radially from said at least one coil.

3. A roll according to claim 2 wherein said coil has a circular cross-section.

4. A roll according to claim 2 wherein said coil has a rectangular cross-section and is oriented so that the pairs of opposite sides thereof are respectively substantially parallel and perpendicular to the axis of the roll shell.

5. A roll according to claim 2 wherein said material of said coil is a metal.

6. A roll according to claim 1 wherein said insert includes a plurality of annular members spaced along the interior of said shell and aligned with the bearing surfaces of said pressure devices, the inner surfaces of said annular inserts forming said bearing surfaces for said pressure devices.

7. A roll according to claim 6 wherein said annular members are metal.

8. A roll according to claim 2 wherein said filaments are metal wires.

9. A roll according to claim 1 wherein said insert is a corrugated tube which is coaxial with the roll shell.

10. A roll according to claim 1 including means for supplying pressurized fluid to said pressure devices and means for separately regulating the pressure of the fluid supplied to separate groups of pressure devices, each group including at least one of said devices.

11. A roll according to claim 1 in which said pressure devices include means for forming a hydrostatic fluid cushion between the bearing surfaces of said pressure devices and the interior of said roll shell.

12. A roll according to claim 1 wherein said pressure devices are arranged in a row along the length of the roll and the roll includes a plurality of hydraulic lift-off devices spaced along the length of the roll diametrically opposite said row for exerting lift-off forces on the roll shell.

* * * * *

UNITED STATES PATENT AND TRADEMARK OFFICE
CERTIFICATE OF CORRECTION

PATENT NO. : 4,069,569
DATED : January 24, 1978
INVENTOR(S) : Werner Meckel et al It is certified that error appears in the above-identified patent and that said Letters Patent are hereby corrected as shown below:

In claim 10, line 5, insert -- pressure -- before "devices".

In claim 11, line 1, change the dependency from "1" to -- 10 --.

Signed and Sealed this

Twenty-sixth Day of September 1978

[SEAL]

Attest:

RUTH C. MASON
Attesting Officer

DONALD W. BANNER
Commissioner of Patents and Trademarks